US009842668B2

(12) United States Patent
Shim et al.

(10) Patent No.: US 9,842,668 B2
(45) Date of Patent: Dec. 12, 2017

(54) COMPOSITION FOR TRANSPARENT ELECTRODE AND TRANSPARENT ELECTRODE FORMED FROM COMPOSITION

(71) Applicant: SAMSUNG SDI CO., LTD., Yongin-si (KR)

(72) Inventors: Dae Seob Shim, Uiwang-si (KR); Young Sil Lee, Uiwang-si (KR); Kyoung Tae Youm, Uiwang-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 183 days.

(21) Appl. No.: 14/647,977

(22) PCT Filed: Aug. 20, 2013

(86) PCT No.: PCT/KR2013/007459
§ 371 (c)(1),
(2) Date: May 28, 2015

(87) PCT Pub. No.: WO2014/088186
PCT Pub. Date: Jun. 12, 2014

(65) Prior Publication Data

US 2015/0294751 A1 Oct. 15, 2015

(30) Foreign Application Priority Data

Dec. 7, 2012 (KR) ........................ 10-2012-0141842
Aug. 14, 2013 (KR) ........................ 10-2013-0096359

(51) Int. Cl.
*B23B 5/16* (2006.01)
*H01B 1/22* (2006.01)
*H01B 1/24* (2006.01)

(52) U.S. Cl.
CPC ................. *H01B 1/22* (2013.01); *H01B 1/24* (2013.01)

(58) Field of Classification Search
CPC ...... H01B 1/02; H01B 1/22; H01L 31/022466
(Continued)

(56) References Cited

U.S. PATENT DOCUMENTS 8,198,796 B2 6/2012 Takada
8,518,472 B2 8/2013 Veerasamy
(Continued)

FOREIGN PATENT DOCUMENTS

JP 2009-070660 * 4/2009 ............... H01B 5/14
KR 10-2010-0114399 A 10/2010
(Continued)

OTHER PUBLICATIONS

International Search Report in counterpart International Application No. PCT/KR2013/007459 dated Nov. 22, 2013, pp. 1-4.
(Continued)

*Primary Examiner* — Khanh Tuan Nguyen
(74) *Attorney, Agent, or Firm* — Additon, Higgins & Pendleton, P.A.

(57) ABSTRACT

A composition for a transparent electrode according to the present invention comprises (A) a carbon nanotube dispersing solution and (B) a metal nanowire solution having a zeta potential with the same polarity as the carbon nanotube dispersing solution, and a transparent electrode coated with the composition for the transparent electrode has superior transmittance, electrical conductivity and transparency.

16 Claims, 1 Drawing Sheet

(58) Field of Classification Search
USPC ..................... 361/679.21; 428/408, 688, 323
See application file for complete search history.

(56) References Cited

U.S. PATENT DOCUMENTS

2009/0129004 A1* 5/2009 Gruner ............ H01L 31/022466 361/679.21
2010/0101829 A1 4/2010 Verhaverbeke et al.
2010/0101830 A1 4/2010 Nalamasu et al.
2010/0101832 A1 4/2010 Verhaverbeke et al.
2010/0266838 A1* 10/2010 Lee .......................... H01B 1/22 428/323
2011/0039124 A1* 2/2011 Ikeuchi .................... C08J 7/045 428/688
2014/0308524 A1* 10/2014 Shim ........................ H01B 1/02 428/408

FOREIGN PATENT DOCUMENTS

KR 10-2011-0082055 A 7/2011
WO 2010-010838 A1 1/2010
WO 2011-109125 A1 9/2011
WO 2014/088186 A1 6/2014

OTHER PUBLICATIONS

Tokuno et al., "Hybrid transparent electrodes of silver nanowires and carbon nanotubes: a low-temperature solution process," Nanoscale Research Letters, May 31, 2012, vol. 7, Issue 1, No. 281, pp. 1-7.

* cited by examiner

[Fig. 1]
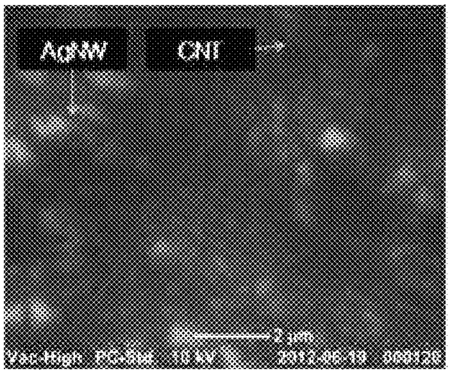
[Fig. 2]
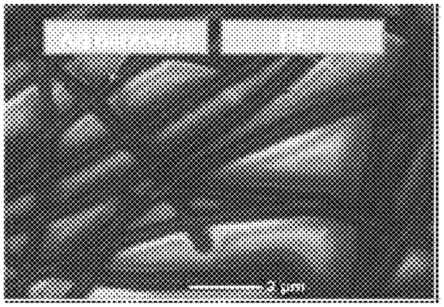

COMPOSITION FOR TRANSPARENT ELECTRODE AND TRANSPARENT ELECTRODE FORMED FROM COMPOSITION

CROSS-REFERENCE TO RELATED APPLICATIONS

This application claims priority to and the benefit of International Application No. PCT/KR2013/007459, filed Aug. 20, 2013, which published as WO 2014/088186 on Jun. 12, 2014, Korean Patent Application No. 10-2012-0141842, filed in the Korean Intellectual Property Office on Dec. 7, 2012, and Korean Patent Application No. 10-2013-0096359, filed in the Korean Intellectual Property Office on Aug. 14, 2013, the entire disclosure of each of which is incorporated herein by reference.

TECHNICAL FIELD

The present invention relates to a composition for a transparent electrode. More particularly, the present invention relates to a composition for a transparent electrode having superior transmittance, electrical conductivity and transparency.

BACKGROUND ART

Recently, technology for thin and light display fields has accumulatively advanced and, thus, interest on materials for transparent electrodes is increasing. Materials for transparent electrodes must have electrical conductivity and transparent characteristics. Such transparent electrode materials are mainly used for high-tech display devices such as flat panel displays and touch screen panels.

Materials as transparent electrodes in such flat display fields have been generally used by coating a metal oxide electrode such as an indium tin oxide (ITO) electrode, an indium zinc oxide (IZO) electrode on a glass or plastic substrate through a deposition method such as sputtering. Although transparent electrode films manufactured using the metal oxides have high conductivity and transparency, but low frictional resistance and poor bendability. In addition, since natural reserves of indium, as a main material are limited, costs for indium are very high and indium has poor processability.

So as to overcome the processability problem described above, transparent electrodes using a conductive polymer such as polyaniline or polythiophene are being developed. Transparent electrode films using the conductive polymer may have high conductivity through doping, superior bondability of a coating film, and superior bendability. However, it is difficult for the transparent films using the conductive polymer to obtain superior electrical conductivity to the extent of being used for transparent electrodes. In addition, there is a problem that the transparent films using the conductive polymer have low transparency.

Therefore, carbon nanotubes have been developed as materials compared with indium tin oxides (ITO). Such carbon nanotubes are used in a variety of fields and, particularly, research into electrode materials is being actively performed due to superior electrical conductivity of the carbon nanotubes.

Graphite sheets of carbon nanotubes have a cylinder shape with nano-sized diameters and have a $sp^2$ bond structure. Depending upon the angles and structures of the graphite sheets, the carbon nanotubes exhibit conductive or semiconductive characteristics. In addition, the carbon nanotubes are classified into single-walled carbon nanotubes (SWCNT), double-walled carbon nanotubes (DWCNT), multi-walled carbon nanotubes (MWCNT), and rope carbon nanotubes, depending upon the number of bonds forming walls.

Especially, since the SWCNT has metallic characteristics and semiconductive characteristics, the SWCNT exhibits various electronical, chemical, physical and optical characteristics. Using such characteristics, more elaborate and integrated devices are realized. Examples of application fields of carbon nanotubes being currently studied include flexible and/or ordinary transparent electrodes, electrostatic dissipation films, field emission devices sheet type heating elements, optoelectronic devices, a variety of sensors, transistors, and the like.

Such carbon nanotubes are actively used as a conductive material but, when the carbon nanotubes are used in transparent electrodes, there is a problem that electrical conductivity is not sufficiently secured. However, since carbon nanotubes have relatively low haze values, transparency may be easily secured.

On the other hand, metal nanowires may be oxidized as time passes, and, when the metal nanowires are oxidized, electrical conductivity of transparent electrodes may be deteriorated, electrodes may be corroded and discoloration may be caused. Therefore, to use transparent electrodes for a long time, oxidation of metal nanowires has to be prevented. In addition, since metal nanowires exhibit superior electrical conductivity but decreased transparency, a technical solution to maintain electrical conductivity and secure transparency is required when the metal nanowires are applied.

International Patent Application Pub. NO. WO 2010/010838 discloses a transparent electrode comprising a transparent conductive layer composed of at least one conductive fiber type selected from carbon nanotubes and metal nanowires, and a surfactant. However, there is a problem that electrical conductivity and transparency are not superior due to poor dispersibility of the conductive fiber.

In order to address the aforementioned problems, the present inventors developed a transparent electrode having superior transmittance, electrical conductivity and transparency by applying a composition for a transparent electrode comprising (A) a carbon nanotube dispersing solution and (B) a metal nanowire solution having a zeta potential with the same polarity for superior dispersibility.

DISCLOSURE

Technical Problem

The present invention provides a composition for a transparent electrode that can have superior transmittance.

The present invention also provides a composition for a transparent electrode that can have superior electrical conductivity.

The present invention further provides a composition for a transparent electrode that can have superior transparency.

The present invention further provides a transparent electrode that can have superior transmittance, electrical conductivity and transparency.

The above and other objects can be accomplished by the present invention described below.

Technical Solution

A composition for a transparent electrode in accordance with the present invention comprises (A) a carbon nanotube dispersing solution and (B) a metal nanowire solution having zeta potential with the same polarity as the carbon nanotube dispersing solution.

In accordance with another aspect of the present invention, the composition comprising the carbon nanotube dispersing solution (A) and the metal nanowire solution (B) may further comprise (C) a surfactant having a zeta potential with the same polarity as the composition.

In the present invention, an absolute value of the zeta potential is 0.1 to 60.

The composition for the transparent electrode may comprise 20 to 75% by weight of the carbon nanotube dispersing solution (A) and 25 to 80% by weight of the metal nanowire solution (B).

The carbon nanotube dispersing solution (A) may comprise 0.01 to 1 parts by weight of the carbon nanotube based on 100 parts by weight of a solvent, the metal nanowire solution (B) may comprise 1 to 3 parts by weight of the metal nanowire based on 100 parts by weight of a solvent. The surfactant (C) may be included in an amount of 0.05 to 3 parts by weight based on 100 parts by weight of the carbon nanotube dispersing solution (A) and the metal nanowire solution (B).

In the carbon nanotube dispersing solution (A), a single-walled carbon nanotube or a double-walled carbon nanotube is included in an amount of 90 to 100% by weight based on the total of carbon nanotubes and an aspect ratio of the carbon nanotubes is 1:10 to 1:20,000.

The metal used in the metal nanowire solution (B) is silver (Ag), gold (Au), platinum (Pt), tin (Sn), iron (Fe), nickel (Ni), cobalt (Co), aluminum (Al), zinc (Zn), copper (Cu), indium (In), titanium (Ti) or a combination thereof, and an aspect ratio of the metal nanowire is 1:20 to 1:2,000.

The solvent used in the carbon nanotube dispersing solution (A) and the metal nanowire solution (B) is distilled water, methanol, ethanol, acetone, methyl ethyl ketone, isopropyl alcohol, butyl alcohol, ethylene glycol, polyethylene glycol, tetrahydrofuran, dimethylformamide, dimethylacetamide, hexane, cyclohexanone, toluene, chloroform, dichlorobenzene, dimethylbenzene, pyridine, aniline, or a combination thereof.

The composition for the transparent electrode (b) is coated on a base substrate (a) of the transparent electrode according to the present invention.

Hereinafter, the present invention will be described in more detail below.

Effect of the Invention

A composition for a transparent electrode according to the present invention provides a transparent electrode having superior transmittance, electrical conductivity and transparency.

DESCRIPTION OF DRAWINGS

FIG. 1 illustrates a scanning electron microscope (SEM) image of a transparent electrode manufactured according to Example 1 of the present invention.

FIG. 2 illustrates an SEM image of a transparent electrode manufactured according to Comparative Example 1 of the present invention.

BEST MODE

The present invention relates to a composition for a transparent electrode, more particularly to a composition for a transparent electrode having superior transmittance, electrical conductivity and transparency.

Composition for Transparent Electrode

The composition for the transparent electrode according to an embodiment of the present invention comprises (A) a carbon nanotube dispersing solution and (B) a metal nanowire solution having a zeta potential with the same polarity.

In another embodiment of the present invention, the composition comprising the carbon nanotube dispersing solution (A) and the metal nanowire solution (B) may further comprise (C) a surfactant having a zeta potential with the same polarity.

(A) Carbon Nanotube Dispersing Solution

The carbon nanotube dispersing solution (A) is used so as to prevent transparency deterioration due to the metal nanowire solution (B) and, reduce influence on electrical conductivity when network structure deformation caused by low density of a network structure affecting the electrical conductivity occurs, in case of using nanowire solution (B) alone. The carbon nanotube dispersing solution (A) of the present invention comprises a solvent and a carbon nanotube.

So as to prepare one solution by well dispersing the carbon nanotube dispersing solution (A) and the metal nanowire solution (B), the carbon nanotube dispersing solution (A) and the metal nanowire solution (B) must have a zeta potential with the same polarity. For example, a zeta potential polarity of the metal nanowire solution (B) must be (+) when a zeta potential polarity of the carbon nanotube dispersing solution (A) is (+), and a zeta potential polarity of the metal nanowire solution (B) must be (−) when a zeta potential polarity of the carbon nanotube dispersing solution (A) is (−).

When the carbon nanotube dispersing solution (A) and the metal nanowire solution (B) have a zeta potential with the same polarity, a stable network structure may be formed and antioxidant effects in respect of the metal nanowire may be had, whereby transparency, stability and efficiencies for electrical conductivity may be maximized.

An absolute value of the zeta potential is 0.1 to 60. A solution is aggregated when the absolute value of the zeta potential is less than 0.1, and current flow is disturbed when the absolute value of the zeta potential is greater than 60. Aggregation of a solution may be improved by using a nonpolar surfactant but natural properties of the carbon nanotube may be undesirably deteriorated.

As the carbon nanotube, at least one selected from a single-walled carbon nanotube (SWCNT), a double-walled carbon nanotube (DWCNT), a multi-walled carbon nanotube (MWCNT) and a rope carbon nanotube may be used. There among, it is preferable to use a carbon nanotube comprising at least 90% by weight of the single-walled or double-walled carbon nanotube, and having an aspect ratio of 1:10 to 1:20,000.

When the aspect ratio of the carbon nanotube is less than 1:10, the number of contact junctions increases when a random network of a wire-shaped structure is formed and, thus, sheet resistance increases, and the number of the carbon nanotubes increases to maintain the sheet resistance, whereby transmittance may be decreased and support function of the metal nanowire may be decreased. On the other hand, when the aspect ratio of the carbon nanotube is greater than 1:20,000, dispersibility of the carbon nanotube is decreased and, thus, stability of the solution is affected, and a sheet resistance may become non-uniform when a random network is formed.

As the solvent, distilled water, methanol, ethanol, acetone, methyl ethyl ketone, isopropyl alcohol, butyl alcohol, ethylene glycol, polyethylene glycol, tetrahydrofuran, dimethylformamide, dimethylacetamide, hexane, cyclohexanone, toluene, chloroform, dichlorobenzene, dimethylbenzene, pyridine, aniline or a combination thereof may be used. When distilled water is used as the solvent, an eco-friendly preparation method may be desirably provided.

The carbon nanotube dispersing solution (A) may comprise 0.01 to 1 parts by weight of the carbon nanotube based on 100 parts by weight of the solvent. When the amount of the carbon nanotube is less than 0.01 parts by weight, transparency is decreased and adhesion and chemical stability are decreased due to a low density of a network structure. On the other hand, when the amount of the carbon nanotube is greater than 1 part by weight, it is difficult to prepare a dispersing solution, and transparency decreases.

The carbon nanotube dispersing solution (A) of the present invention may be included in an amount of 20 to 75% by weight based on 100% by weight of the carbon nanotube dispersing solution (A) and the metal nanowire solution (B). When the amount of the carbon nanotube dispersing solution (A) is less than 20% by weight, transmittance is increased, but electrical conductivity decreases when a network structure is deformed. On the other hand, when the amount of the carbon nanotube dispersing solution (A) is greater than 75% by weight, transmittance and electrical conductivity are deteriorated.

(B) Metal Nanowire Solution

The metal nanowire solution (B) is used to prevent electrical conductivity reduction due to the carbon nanotube dispersing solution (A). The metal nanowire solution (B) of the present invention comprises a solvent and a metal nanowire, and has the same zeta potential polarity as the carbon nanotube dispersing solution (A), an absolute value of the zeta potential is 0.1 to 60.

As the metal nanowire solution (B), silver (Ag), gold (Au), platinum (Pt), tin (Sn), iron (Fe), nickel (Ni), cobalt (Co), aluminum (Al), zinc (Zn), copper (Cu), indium (In), titanium (Ti), and combinations thereof may be used. There among, a silver nanowire or a copper nanowire having superior electrical conductivity is preferably used, and the silver nanowire having highest electrical conductivity is most preferably used. In this regard, it is preferable to use a metal nanowire having an aspect ratio of 1:20 to 1:2,000.

When the aspect ratio of the metal nanowire is less than 1:20, the number of contact junctions excessively increases when a random network of a wire-shaped structure is formed and, thus, sheet resistance increases, and the number of nanowires increases to maintain the sheet resistance, whereby transmittance may be deteriorated and haze may increase. On the other hand, when the aspect ratio of the metal nanowire is greater than 1:2,000, the number of contact junctions is reduced when a random network is formed after nanowire coating and, thus, a sheet resistance may become non-uniform, whereby a linear resistance after patterning may become non-uniform.

As the solvent, distilled water, methanol, ethanol, acetone, methyl ethyl ketone, isopropyl alcohol, butyl alcohol, ethylene glycol, polyethylene glycol, tetrahydrofuran, dimethylformamide, dimethylacetamide, hexane, cyclohexanone, toluene, chloroform, dichlorobenzene, dimethylbenzene, pyridine, aniline, or a combination thereof may be used. When water is used as the solvent, an eco-friendly preparation method may be desirably provided.

The metal nanowire solution (B) may comprise 1 to 3 parts by weight of the metal nanowire based on 100 parts by weight of the solvent. When the amount of the metal nanowire is less than 1, conductivity is reduced and, when the amount of the metal nanowire is greater than 3, dispersibility is deteriorated.

The metal nanowire solution (B) of the present invention may be included in an amount of 25 to 80% by weight based on 100% by weight of the carbon nanotube dispersing solution (A) and the metal nanowire solution (B). When the amount of the metal nanowire solution (B) is less than 25% by weight, transmittance is reduced, and electrical conductivity is reduced when a network structure is deformed. On the other hand, when the amount of the metal nanowire solution (B) is greater than 80% by weight, a haze value increases.

(C) Surfactant

So as to prepare a carbon nanotube dispersing solution and to stably disperse the carbon nanotube dispersing solution and a metal nanowire dispersion, the composition for the transparent electrode comprising the carbon nanotube dispersing solution (A) and the metal nanowire solution (B) may comprise a surfactant (C). The surfactant (C) of the present invention has the same polarity as the zeta potentials of the carbon nanotube dispersing solution (A) and the metal nanowire solution (B), and an absolute value of the zeta potential is 0.1 to 60.

As an amphiphilic material with hydrophilic and hydrophobic characteristics, the surfactant (C) supports carbon nanotubes to be stably dispersed in an aqueous solution, since the hydrophobic part of the surfactant has affinity to carbon nanotubes and the hydrophilic part thereof has affinity to water, which is a solvent. The hydrophobic part may comprise a long alkyl chain, and the hydrophilic part may have a sodium salt form. The hydrophobic part of the surfactant in the present invention may use a long chain structure comprising 10 or more carbons, and the hydrophilic part thereof may use both an ionic form and a non-ionic form. Preferably, the hydrophilic part comprises a cationic part of cetrimonium and an anionic part of bromine, chlorine or p-toluenesulfonate, and it is preferable to use an organic salt or a halogen based salt.

The surfactant (C) of the present invention may be included in an amount of 0.05 to 3 parts by weight based on 100 parts by weight of the carbon nanotube dispersing solution (A) and the metal nanowire solution (B). When the amount of the surfactant (C) is less than 0.05 parts by weight, the carbon nanotube dispersing solution (A) and the metal nanowire solution (B) are not well dispersed and, thus, it is difficult to prepare one solution. On the other hand, when the amount of the surfactant (C) is greater than 3 parts by weight, transparency and electrical conductivity are decreased.

The composition for the transparent electrode according to the present invention may be prepared by mixing the carbon nanotube dispersing solution (A), the metal nanowire solution (B) and surfactant (C) using a stirrer, and, since a zeta potential polarity of each of the ingredients is the same, one solution may be prepared.

Transparent Electrode

The transparent electrode according to an embodiment of the present invention is characterized by coating (b) the composition for the transparent electrode on (a) a base substrate.

Since the present invention relates to a transparent electrode, the base substrate (a) must fundamentally have transparency. Therefore, as the base substrate (a), a transparency polymer film or a glass substrate is preferably used. As the polymer film, polyester based, polycarbonate based, polyethersulfone based, or acrylic transparent film may be used. More particularly, polyethylene terephthalate (PET), polyethylene naphthalate (PEN), or polyethersulfone (PES) is preferably used.

The composition for the transparent electrode (b) may be coated on the base substrate (a) using spraying and roll-to-roll coating such as slot-die coating, gravure coating, micro-gravure coating, comma coating or the like. There among, slot-die coating is desirable.

The coated transparent electrode is dried for 1 to 10 minutes at 50 to 100° C., and then washed with water for one minute or less. Subsequently, the washed electrode is further dried for 1 to 10 minutes at 50 to 100° C. thereby completing of manufacture of a transparent electrode. The manufactured transparent electrode may be additionally over-coated.

The transparent electrode of the present invention has a total transmittance of 89 to 98% measured for a wavelength of 550 nm using a UV/Vis spectrometer and a haze value of 0.2 to 2% measured using a haze meter.

In addition, the transparent electrode of the present invention has a sheet resistance of 20 to 200Ω/□ measured using a 4 point-probe method.

The manufactured transparent electrode has superior transmittance, electrical conductivity and transparency, and, thus, may be applied to high-tech display devices such as flat panel displays and touch screen panels.

Now, the present invention will be described in more detail with reference to the following examples. These examples are provided only for illustration of the present invention and should not be construed as limiting the scope and spirit of the present invention.

MODE FOR INVENTION

Examples and Comparative Examples

Each component used in Examples and Comparative Example is as follows.

(a) Base Substrate

A PET film, XU46H, manufactured by Toray was used and transmittance was 93.06%.

(b) Composition for Transparent Electrode (A) Carbon Nanotube Dispersing Solution (A1) 100 parts by weight of a deionized aqueous solution, 0.2 parts by weight of an SA210 grade single-walled carbon nanotube manufactured by NanoSolution Corporation and cetrimonium bromide, as a cationic dispersion, manufactured by Aldrich Corporation were dispersed for 30 minutes or less at 1 KW using a circulation sonication. After dispersing, a carbon nanotube dispersing solution (A1), in which a zeta potential of an upper portion thereof is (+) 20 mV and an aspect ratio is 1:500 to 1:1,000, was obtained by high-speed centrifuging for 30 minutes or less at 11,000 rpm in a high-speed centrifuge, SUPRA22K, manufactured by HanilSC.

(A2) A carbon nanotube dispersing solution (A2) prepared according to the same method as (A1), except that 1.5 parts by weight of the carbon nanotube was used, was used.

(A3) was prepared according to the same method as (A1) except that dodecyl solfonic acid Sodium salt (SDS) as an anionic dispersant was used, and a carbon nanotube dispersing solution (A3) having a zeta potential of (−) 20 mV was used.

(B) Metal Nanowire Solution

A silver nanowire solution (B1) with a zeta potential of (+) 6 mV and an aspect ratio of 1:1000 using a silver nanowire solution manufactured by Cambrios Corporation was obtained.

(C) Surfactant

Cetrimonium bromide having a zeta potential of (+) 10 mV, manufactured by Aldrich Corporation was used in an amount of 0.1 parts by weight based on 100 parts by weight of the carbon nanotube dispersing solution (A) and the metal nanowire solution (B).

Examples 1 to 3 and Comparative Examples 1 to 5

Each of the ingredients was added in an amount disclosed in Table 1 below and mixed for 20 minutes or more using a stirrer, thereby preparing one solution comprising the composition for the transparent electrode. The prepared solution was coated on a base substrate using a bar coating device equipped with a No. 10 Mayer bar. The coated base substrate was dried for three minutes at 70° C. and washed with water for one minute or less. Subsequently, properties were measured after further drying for three minutes at 70° C. and over-coating.

In Table 1 below, mix ratios of (A) and (B) are represented in % by weight based on 100% by weight of the total amount of (A) and (B), and (C) is represented in parts by weight based on 100 parts by weight of the total of (A) and (B).

TABLE 1

| | | Examples | | | Comparative Examples | | | | |
|---|---|---|---|---|---|---|---|---|---|
| | | 1 | 2 | 3 | 1 | 2 | 3 | 4 | 5 |
| (A) | (A1) | 50 | 40 | 33.3 | — | — | — | — | — |
| | (A2) | — | — | — | — | — | — | 50 | — |
| | (A3) | — | — | — | — | — | — | — | 50 |
| (B) | | 50 | 60 | 66.7 | 50 | 60 | 66.7 | 50 | 50 |
| (C) | | 0.1 | 0.1 | 0.1 | — | — | — | 0.1 | 0.1 |

Properties of the manufactured transparent electrode were measured according to methods below. Results are shown in Table 2.

(1) Total Transmittance (T.T, %): Total Transmittance was measured using a haze meter.

(2) Diffraction (DIF, %): Diffraction was measured using a haze meter.

(3) Parallel Transmittance (P.T, %): Parallel Transmittance was measured using a haze meter. Parallel Transmittance (P.T) means a difference between a Total Transmittance (T.T) and a Diffraction (DIF).

(4) Haze (%): Haze was measured using a haze meter (Nippon Denshoku Industries Co. LTD, NHD-5000). A haze value means a ratio of a Diffraction (DIF) with respect to a Total Transmittance (T.T).

(5) Electrical conductivity (Ω/□): a sheet resistance value was measured based on 4 point-probe method using Loresta-GP <MCP-T610> manufactured by Mitsubishi Chemical Corporation.

TABLE 2

| | Examples | | | Comparative Examples | | | | |
|---|---|---|---|---|---|---|---|---|
| | 1 | 2 | 3 | 1 | 2 | 3 | 4 | 5 |
| Total Trans-mit-tance | 96.76 | 96.22 | 96.21 | 96.92 | 97.66 | 96.73 | — | — |

TABLE 2-continued

| | Examples | | | Comparative Examples | | | | |
|---|---|---|---|---|---|---|---|---|
| | 1 | 2 | 3 | 1 | 2 | 3 | 4 | 5 |
| Diffraction | 0.99 | 1.37 | 1.63 | 1.46 | 1.36 | 1.65 | — | — |
| Parallel Transmittance | 95.77 | 94.85 | 94.58 | 95.46 | 96.30 | 95.06 | — | — |
| Haze Value | 1.02 | 1.42 | 1.69 | 1.51 | 1.39 | 1.73 | — | — |
| Sheet Resistance | 180 | 100 | 87 | 150 | 140 | 100 | — | — |

As shown in Table 2, it can be confirmed that the transparent electrodes according to Examples 1 to 3 have high transmittance, superior transparency due to the low haze value, and superior electrical conductivity due to a low sheet resistance value measured.

In contrast, it can be confirmed that, in Comparative Examples 1 to 3 not using the carbon nanotube dispersing solution (A), low transmittance, reduced transparency due to the high haze value and reduced electrical conductivity due to a high sheet resistance value measured are exhibited, when compared to Examples 1 to 3.

In addition, since ultrasonic processing was impossible due to the high viscosity of the carbon nanotube dispersing solution (A2) according to Comparative Example 4, in which the carbon nanotube dispersing solution (A2) prepared using the carbon nanotube in an amount greater than the above range, it was impossible to prepare the carbon nanotube dispersing solution (A2) and, thus, it was impossible to measure properties thereof. Since the carbon nanotube dispersing solution (A3) and the metal nanowire solution (B) were not well dispersed in Comparative Example 5, in which the carbon nanotube dispersing solution (A3) having a zeta potential polarity different from the metal nanowire solution (B) was used, it was impossible to prepare the composition for the transparent electrode (b) and, thus, it was impossible to measure properties thereof.

Those of ordinary skill in the art may carry out a variety of applications and modifications based on the foregoing teachings within the scope of the present invention, and these modified embodiments are within the scope of the present invention.

What is claimed is:

1. A composition for a transparent electrode comprising:

(A) a carbon nanotube dispersing solution having a zeta potential with a polarity, (B) a metal nanowire solution having a zeta potential with the same polarity as the carbon nanotube dispersing solution, and (C) a surfactant having a zeta potential with the same polarity as the zeta potential of the carbon nanotube dispersing solution (A) and the zeta potential of the metal nanowire solution (B), wherein an absolute value of the zeta potential of the surfactant is 0.1 to 60.

2. The composition according to claim 1, wherein the composition comprises 20 to 75% by weight of the carbon nanotube dispersing solution (A) and 25 to 80% by weight of the metal nanowire solution (B).

3. The composition according to claim 1, wherein the carbon nanotube dispersing solution (A) comprises 0.01 to 1 parts by weight of the carbon nanotube based on 100 parts by weight of a solvent.

4. The composition according to claim 3, wherein the solvent is selected from the group consisting of distilled water, methanol, ethanol, acetone, methyl ethyl ketone, isopropyl alcohol, butyl alcohol, ethylene glycol, polyethylene glycol, tetrahydrofuran, dimethylformamide, dimethylacetamide, hexane, cyclohexanone, toluene, chloroform, dichlorobenzene, dimethylbenzene, pyridine, aniline and combinations thereof.

5. The composition according to claim 1, wherein the metal nanowire solution (B) comprises 1 to 3 parts by weight of the metal nanowire based on 100 parts by weight of a solvent.

6. The composition according to claim 5, wherein the solvent is selected from the group consisting of distilled water, methanol, ethanol, acetone, methyl ethyl ketone, isopropyl alcohol, butyl alcohol, ethylene glycol, polyethylene glycol, tetrahydrofuran, dimethylformamide, dimethylacetamide, hexane, cyclohexanone, toluene, chloroform, dichlorobenzene, dimethylbenzene, pyridine, aniline and combinations thereof.

7. The composition according to claim 1, comprising the surfactant (C) in an amount of 0.05 to 3 parts by weight based on 100 parts by weight of the carbon nanotube dispersing solution (A) and the metal nanowire solution (B).

8. The composition according to claim 1, wherein the carbon nanotube dispersing solution (A) comprises 90 to 100% by weight of a single-walled or double-walled carbon nanotube based on total carbon nanotubes.

9. The composition according to claim 1, wherein the carbon nanotube dispersing solution (A) comprises a carbon nanotube having an aspect ratio of 1:10 to 1:20,000.

10. The composition according to claim 1, wherein a metal used in the metal nanowire solution (B) comprises a metal nanowire selected from the group consisting of silver (Ag), gold (Au), platinum (Pt), tin (Sn), iron (Fe), nickel (Ni), cobalt (Co), aluminum (Al), zinc (Zn), copper (Cu), indium (In), titanium (Ti) and combinations thereof.

11. The composition according to claim 1, wherein the metal nanowire solution (B) comprises a metal nanowire having an aspect ratio of 1:20 to 1:2,000.

12. A transparent electrode formed by coating the composition for the transparent electrode according to claim 1 on a base substrate.

13. The transparent electrode according to claim 12, wherein the transparent electrode has a total transmittance of 89 to 98% measured for a wavelength of 550 nm using a UV/Vis spectrometer, and a haze value of 0.2 to 2% measured using a haze meter.

14. The transparent electrode according to claim 12, wherein the transparent electrode has a sheet resistance of 20 to 200Ω/□ measured using a 4 point-probe method.

15. The composition according to claim 1, wherein the surfactant (C) comprises a cetrimonium cation.

16. The composition according to claim 15, wherein the surfactant (C) comprises a halogen and/or p-toluene sulfonate anion.

* * * * *